United States Patent [19]
Kliot

[11] 3,776,055
[45] Dec. 4, 1973

[54] SPINNING WHEEL
[76] Inventor: Jules Kliot, 2150 Stuart St., Berkeley, Calif. 94705
[22] Filed: May 19, 1972
[21] Appl. No.: 255,132

[52] U.S. Cl............................................ 74/242.15 R
[51] Int. Cl............................................. F16h 7/10
[58] Field of Search.................. 74/242.15 R, 242.8, 74/242.12 R, 242.13 A, 242.8, 242.10

[56] References Cited
UNITED STATES PATENTS
3,702,570  11/1972  Stikkers ....................... 74/242.15 R
3,026,738  3/1962  Rahlson ....................... 74/242.15 R FOREIGN PATENTS OR APPLICATIONS
60,698  3/1943  Denmark ......................... 74/242.15
1,237,183  4/1970  Great Britain ................... 74/242.15

Primary Examiner—Charles J. Myhre
Assistant Examiner—R. H. Lazarus
Attorney—Harris Zimmerman

[57] ABSTRACT

A unique arrangement of the spindle head of a spinning wheel which permits insertion and removal of a straight spindle as well as a drop spindle, i.e., a spindle with an attached whorl.

5 Claims, 2 Drawing Figures

SPINNING WHEEL

SUMMARY OF INVENTION

My invention consists essentially of three separate belts which, when in tension, support the spindle. Two small belts support the spindle in one direction, one located on each side of a large drive belt which supports the spindle in the other direction. The two small belts are independently supported by free turning pulleys which, by their positioning, control belt tension. The large drive belt is supported directly or indirectly by the drive wheel.

DRAWINGS

Figure 1:
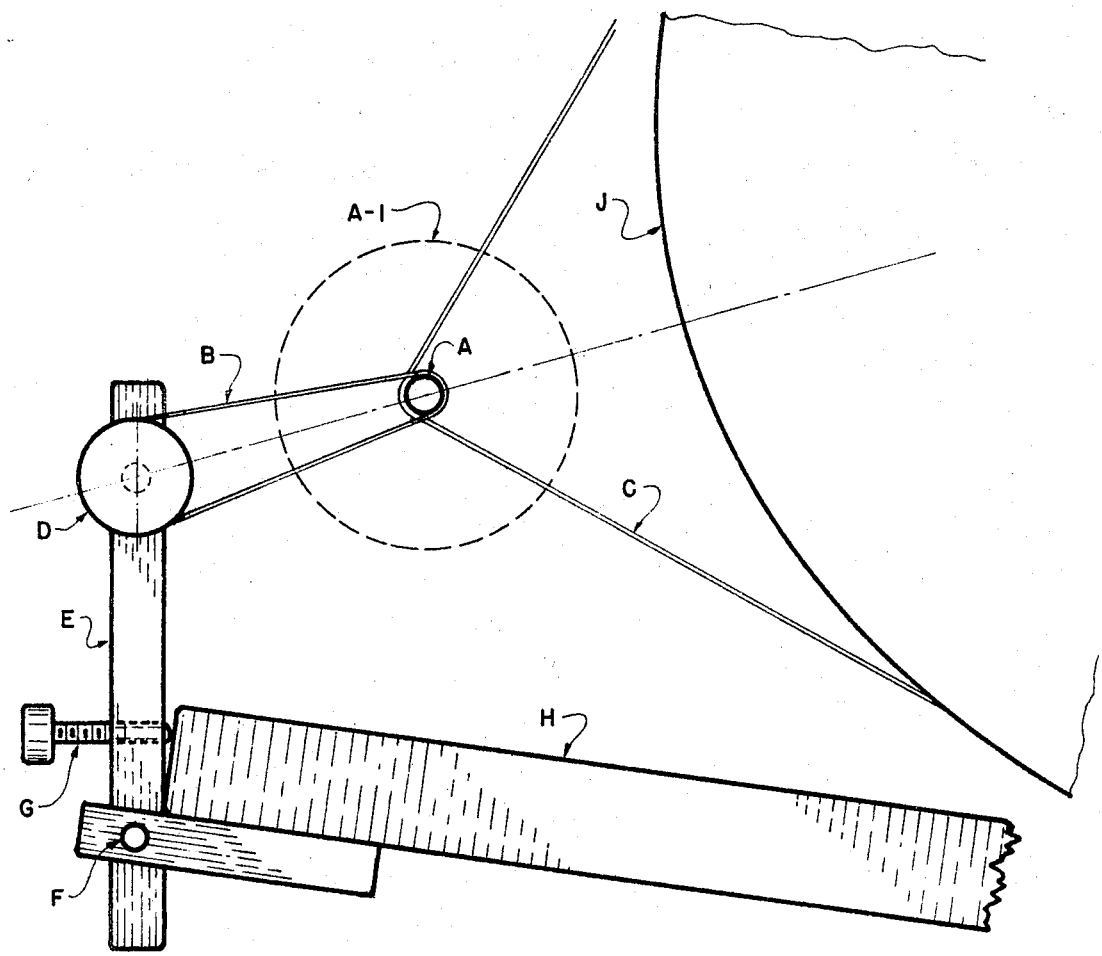

FIG. 1: Side view of Spindle Head showing relationship of Spindle 'A' and supporting belts 'B' and 'C'.

Figure 2:
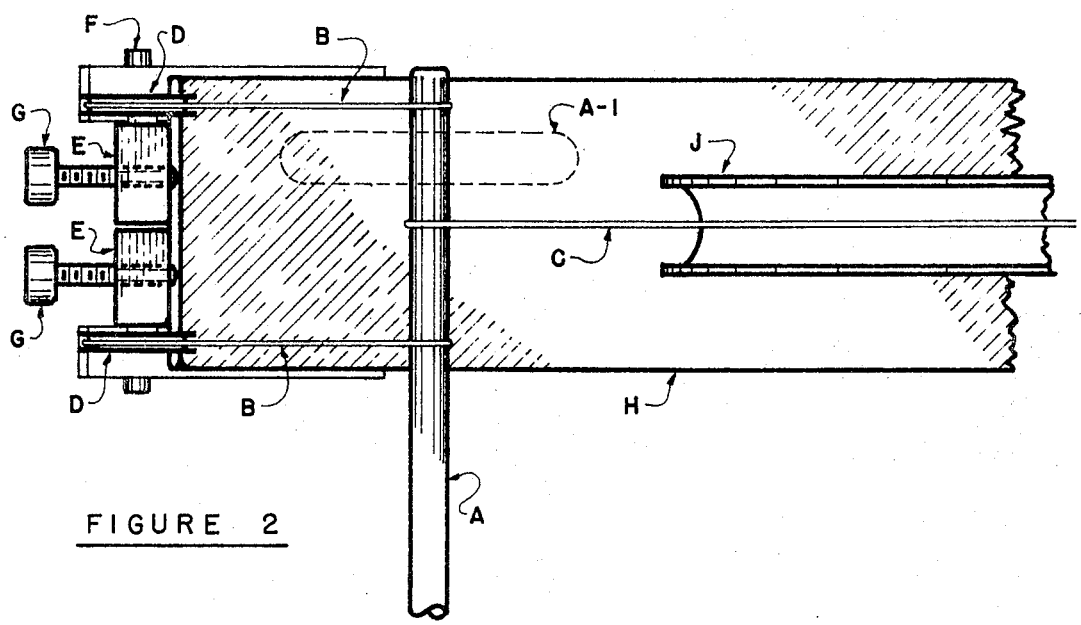

FIG. 2: Plan view of Spindle Head showing relationship of Spindle 'A' and supporting parts.

DESCRIPTION

Referring to FIGS. 1 and 2, a straight spindle 'A' or spindle with whorl 'A-1' is supported between two small belts 'B' and drive belt 'C'. Each small belt 'B' is independently supported by a free turning pulley 'D'. The pulley 'D' is in turn supported by a mechanism to move it forwards or back in relation to center of drive wheel 'J' which supports drive belt 'C'. Such a mechanism is shown by pulley support 'E' and tension screw 'G'. Pulley support 'E' is hinged by pin 'F' attached to base 'H'. Rotating tension screw 'G', which is threaded through pulley support 'E' and bears against end of base 'H', in either direction will move the pulley 'D' laterally in either direction, tightening or loosening all belts.

Spindle 'A' can be removed or inserted by decreasing tension in belts. This is simply done by turning one or both of the tension screws 'G' so that the pulley 'D' can move toward drive wheel 'J'. The spindle 'A' is kept in place by increasing tension in belts. This is done by turning one or both of the tension screws 'G' and then adjusting both tension screws 'G' independently to align spindle 'A' and avoid drift when it is rotating.

Rotating drive wheel 'J' causes spindle 'A' to rotate through the friction of drive belt 'C' on spindle. Free turning pulleys 'D' assure minimum friction and wear on belts and spindle as well as smooth rotation and high speeds.

I claim:

1. In a spinning wheel apparatus, a drive wheel, a spindle having an axis of rotation parallel to and spaced from the axis of rotation of said drive wheel, a drive belt engageable with the periphery of said drive wheel and with the periphery of a medial portion of said spindle, said drive wheel having a diameter substantially in excess of that of said spindle for rotating the latter at a higher speed than that of the drive wheel, a pair of axially aligned spaced pulleys with their axes of rotation parallel to and spaced from the axes of rotation of said spindle and on the opposite side of said spindle from said drive wheel, a pair of belts engageable with said pulleys and with said spindle on opposite sides of said drive belt, and means mounting said pulleys for free rotation.

2. Apparatus as set forth in claim 1 in which said mounting means includes means for selectively varying the spacing between the axis of said pulleys and the axis of said spindle for varying the tension on said belts.

3. Apparatus as set forth in claim 1 in which said drive belt and said pair of belts comprise the sole support for said spindle.

4. Apparatus as set forth in claim 2 including a base member, a pulley support pivotally attached to and extending upwardly from said base member, said pulleys being journalled on said support, and threaded means carried on said support and engageable with said base for rocking and support and thereby effecting said varying spacing between the axes of said pulleys and spindles.

5. Apparatus as set forth in claim 1 in which said pair of belts and said drive belt are parallel to each other.

* * * * *